United States Patent [19]

Ames

[11] Patent Number: 5,210,807
[45] Date of Patent: May 11, 1993

[54] VARIABLE WIDE BAND FIBER OPTIC DELAY LINE

[75] Inventor: Gregory H. Ames, Gales Ferry, Conn.

[73] Assignee: The United States of America as represented by the Secretary of the Navy, Washington, D.C.

[21] Appl. No.: 905,705

[22] Filed: Jun. 29, 1992

[51] Int. Cl.$^5$ .............................................. G02B 6/28
[52] U.S. Cl. ...................................... 385/24; 385/42; 385/27
[58] Field of Search ................. 385/24, 30, 42, 15, 385/27; 372/6

[56] References Cited

U.S. PATENT DOCUMENTS 4,469,397 9/1984 Shaw et al. ........................... 385/27
4,705,350 11/1987 Cheng ................................ 385/24 X

*Primary Examiner*—John D. Lee
*Assistant Examiner*—Phan Thi Heartney
*Attorney, Agent, or Firm*—Michael J. McGowan; Prithvi C. Lall; Michael F. Oglo

[57] ABSTRACT

Apparatus and method for a variable wide band fiber optic delay line. The apparatus comprises components that allow a user to select a delay time of a signal by the use of a wavelength tunable laser. The user selected wavelength determines the length that a light intensity signal corresponding to an electronic signal travels, thereby determining the time of delay.

4 Claims, 1 Drawing Sheet

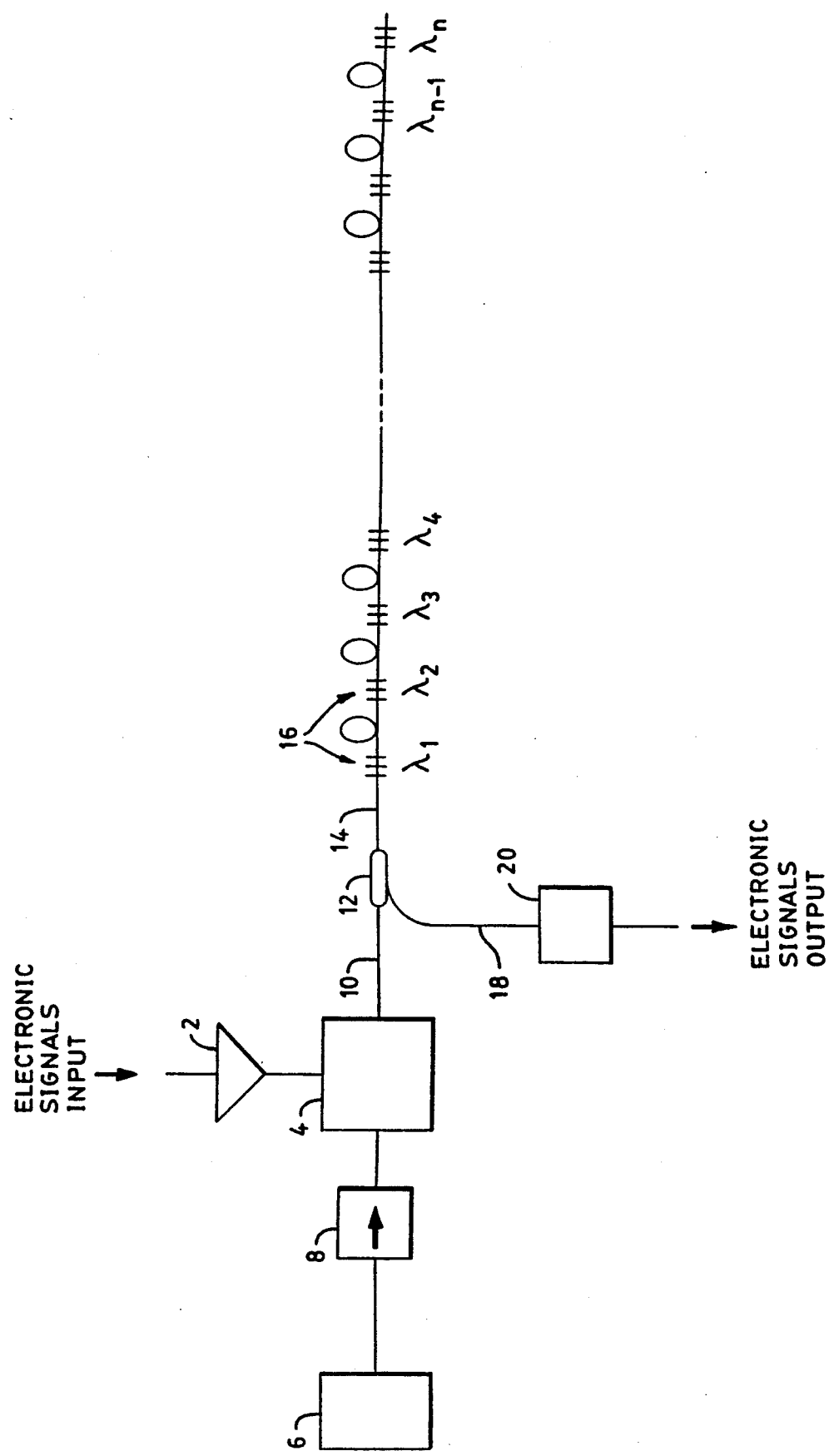

VARIABLE WIDE BAND FIBER OPTIC DELAY LINE

STATEMENT OF GOVERNMENT INTEREST

The invention described herein may be manufactured and used by or for the Government of the United States of America for government purposes without the payment of any royalties thereon or therefor.

BACKGROUND OF THE INVENTION (1) Field of the Invention

This invention relates to variable wide band fiber optic delay lines which provide a variable delay for electronic signals with with very wide bandwidth. The invention permits discrete step adjustment of the delay provided by such a delay line.

(2) Description of the Prior Art

Delay lines have found many uses in electronic processing. Their use is particularly prevalent in radar and electronic warfare or surveillance equipment. The most common delay line technology is Surface Acoustic Wave (SAW) devices. SAW devices are limited in their frequency, bandwidth and available delay. Wide band fiber optics have been proposed, as in microwave delay lines. These provide higher frequences (up to 20 gigahertz((GHz)) or more), high bandwidths (over 10 GHz), and long delays (40 kilometers of fiber give about 200 microseconds of delay, which would require 60 cm of SAW propagation).

To date, one drawback of fiber delay lines is that tunable delay is not available as in SAW technology. Delay is simply determined by the length of the fiber between transmitter and detector. Schemes that would use fiber switching are excessively complicated. Schemes that would use multiple fiber delay lines are expensive due to the expense of multiple transmitters and receivers.

SUMMARY OF THE INVENTION

The invention provides the ability to vary delay line delay in discrete steps. The number of such steps is determined by such factors as laser linewidth, laser tuning range, and reflector linewidth. Given typical linewidths less than 0.1 nanometers, reflector center wavelengths can be spaced by 0.3 nanometers. Given a grating tuned Erbium fiber laser with 30 size of the steps is determined by the length of fiber between reflectors.

This invention accomplishes variable delay using a single laser, modulator and detector. No switching devices are necessary. This results in simplicity and reduced expense.

This invention also allows variable delay with low optical loss when compared with other methods that may use switches or multiple branching architectures.

Because of the simplicity of the invention's structure, and because the delay fiber may be packaged in a small coil, small size is possible.

It is, therefore, an object of the invention to provide a variable wide band fiber optic delay line that provides the ability to vary delay line delay in discrete steps.

A further object of the invention is to provide a variable wide band fiber optic delay line that uses few components, and is simple to manufacture.

A still further object of the invention is to provide a variable wide band fiber optic delay line that has low optical loss.

A still even further object of the invention is to provide a variable wide band fiber optic delay line that is small in size.

A still even further object of the invention is to provide a variable wide band optic fiber delay line that significantly lowers crosstalk relative to schemes that utilize fiber switching. Lower crosstalk is achieved because when the delay line is set to one specific delay, signals with other delays are at much lower levels.

With the above and other objects in view, as will herewith appear, a feature of the present invention is the provision of a variable delay line comprising a wavelength tunable laser adapted to produce a constant light level signal having a user selected wavelength. A optical intensity modulator is adapted to receive the constant light level signal from the laser and to convert an electronic input signal to an output light intensity signal that corresponds to the electronic signal. A fiber optic 2×2 port coupler is adapted to receive the output light intensity signal from the modulator via a first optical fiber and to pass the output light intensity signal to a delay optical fiber. A plurality of reflectors are disposed at predetermined intervals in the delay optical fiber with each of the reflectors having a different reflection wavelength so that the output light intensity signal travels a distance to one of the plurality of reflectors that reflects the output light intensity signal having the user selected wavelength back to the fiber optic 2×2 port coupler. As will become apparent, the predetermined intervals are chosen to provide a desired repertoire of delays. A detector is adapted to receive the reflected output light intensity signal from the fiber optic 2×2 port coupler via a second optical fiber and convert the reflected output light intensity signal to an electronic signal corresponding the electronic input signal which has been delayed for a period of time dependant on the distance between the fiber optic 2×2 port coupler and the one reflector.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent.

The sole drawing is a schematic view illustrative of a preferred embodiment of the invention.

DESCRIPTION OF THE PREFERRED EMBODIMENT

Referring to the sole FIGURE, an electronic input signal to be delayed is amplified to an appropriate level by an amplifier (2), if amplification is necessary. The electronic input signal then drives a suitable optical intensity modulator (4). The modulator (4) may include, but is not limited to, integrated optic, intensity modulators of the Mach Zender or other type. The modulator (4) is supplied a constant light level from a wavelength tunable laser (6). If the application requires additional isolation, the output of the laser (6) is input to an optional optical isolator (8), included in the embodiment shown in the FIGURE. Optical isolation may be necessary when the laser (6) is sensitive to back reflection. The modulator (4) produces an output light signal with intensity that varies as the electronic input signal varies. The output light signal leaves the modulator (4) and is input to a first optical fiber (10). The first optical fiber (10) preferably is of the single-mode type optical fiber. The first optical fiber (10) is joined to a fiber optic 2×2 port coupler (12). Half of the power travels to a delay optical fiber (14). The remaining half of the power is not used. The delay optical fiber (14) preferably is of the single-mode type optical fiber. The delay optical fiber (14) has fiber optic Bragg reflectors (16) placed at uniform intervals. The reflectors (16) may include but are not limited to the type reported by United Technology Research Center (UTRC), as disclosed in U.S. Pat. No. 4,725,110, entitled Method for Impressing Gratings Within Fiber Optics. The reflectors (16) are produced in the delay optical fiber (14) by the refractive index change induced in the delay optical fiber (14) by an ultraviolet laser fringe pattern. The reflectors (16) have a very high reflectance over a very narrow wavelength region (linewidths to 0.1 nanometers have been achieved without optimization).

The reflectors (16) in the delay optical fiber (14) are provided with distinctly different reflection wavelengths, separated sufficiently to minimize unwanted reflections from more than one reflector (16) at a time. For the Bragg reflectors (16) of UTRC, this is accomplished by either tuning the ultraviolet laser, tuning the interferometer producing the fringes, or stretching the delay optical fiber (14) during production of the reflectors (16). The reflectors (16) are separated by lengths of fiber so as to be spaced at intervals corresponding to the desired delay interval.

The laser (6) is a narrow linewidth laser capable of being tuned to a certain wavelength. The tunable laser (6) is critical to the operation of the invention. Any laser with proper linewidth, tuning range, low laser noise and adequate output power can be used. The laser (6) may comprise a grating tuned external cavity laser such as models supplied by British Technology and Dupont (a joint venture) and Santec, with or without Erbium doped laser amplifiers to increase light output. Alternatively, the laser (6) may comprise an Erbium doped fiber laser, tuned by either gratings or Bragg reflectors of UTRC which are stretched to tune the laser. Likewise, tunable distributed feedback (DFB) and tunable distributed Bragg reflector (DBR) laser diodes may be used. The laser is tuned so that its output light is reflected by one of the reflectors (16).

The signal delay is established (or defined) by the path of the modulated signal (namely the output light intensity signal) which extends from the output of the modulator (4), through the coupler (12), to a reflector (16), back through the coupler (12), through a second optical fiber (18), and to a detector (20). At the detector (20), the light signal is converted to an electronic signal which has been delayed for a period of time dependent on the length of the delay optical fiber (14) path the light signal has traveled. The length is selected by the operator by tuning the output wavelength of the laser (6) so that the output wavelength is reflected by a different reflector (16) and thereby travels a different optical path.

Because the excess loss of the Bragg reflector (16) from UTRC is low at wavelengths outside its narrow reflection band, many reflectors (16) can be put on a delay optical fiber (14) without causing significant loss. The number of delay settings is then a function of the tuning range of the laser (6) and the number and spacing of the reflectors (16). This, in turn, is dependent on how narrow the reflectance bandwidth of the Bragg reflectors can be made, their environmental stability, and allowed levels of crosstalk and loss.

Obviously many modifications and variations of the present invention ma become apparent in light of the above teachings. For example, 2×2 port coupler 12 could be replaced by a type of coupling device supplied by Optics for Research of Caldwell, NJ 07006, under the product name Optical Circulator. In may be justified, such substitution would result in reduced optical loss. It is therefore to be understood that within in the scope of the appended claims the invention may be practiced otherwise than as specifically described.

What is claimed is:

1. A variable fiber optic delay line comprising:
   a wavelength tunable laser adapted to produce a constant light level signal having a user selected wavelength;
   an optical intensity modulator adapted to receive said constant light level signal from said laser to convert an electronic input signal to an output light intensity signal that corresponds to said electronic input signal;
   a fiber optic 2×2 port coupler adapted to receive said output light intensity signal from said modulator via a first optical fiber and to pass said output light intensity signal to a delay optical fiber;
   a plurality of reflectors disposed at predetermined intervals in said delay optical fiber with each of said reflectors having a different reflection wavelength so that said output light intensity signal travels a distance to one of said plurality of reflectors that reflects said output light intensity signal having the user selected wavelength back to said fiber optic 2×2 port coupler; and
   a detector adapted to receive said reflected output light intensity signal from said fiber optic 2×2 port coupler via a second optical fiber and convert said reflected output light intensity signal to an electronic signal corresponding to said electronic input signal which has been delayed for a period of time dependent on said distance between said fiber optic 2×2 port coupler and said one reflector.

2. The variable fiber optic delay line of claim 1 further comprising an optical isolator adapted to optically isolate said laser.

3. The variable fiber optic delay line of Claim 1 wherein said plurality of reflectors are Bragg reflectors.

4. The variable fiber optic delay line of claim 1 wherein said predetermined intervals in the delay optical fiber at which the reflectors are disposed are uniform intervals resulting in the delay produced by successive reflectors varying in accordance with the constant multiplied by successive increasing integer numbers.

* * * * *